United States Patent [19]

Nishioka et al.

[11] Patent Number: 4,747,660
[45] Date of Patent: May 31, 1988

[54] LIGHT TRANSMITTER

[75] Inventors: Kimihiko Nishioka; Tsutomu Yamamoto, both of Hachioji, Japan

[73] Assignee: Olympus Optical Co., Ltd., Japan

[21] Appl. No.: 14,132

[22] Filed: Jan. 29, 1987

Related U.S. Application Data

[63] Continuation of Ser. No. 656,862, Oct. 2, 1984, abandoned.

[30] Foreign Application Priority Data

Aug. 12, 1983 [JP] Japan .................................. 58-232125

[51] Int. Cl.⁴ .................................................. G02B 6/06
[52] U.S. Cl. ................................. 350/96.25; 350/96.26
[58] Field of Search ............... 350/96.10, 96.24, 96.25, 350/96.26, 96.27

[56] References Cited

U.S. PATENT DOCUMENTS

| | | | |
|---|---|---|---|
| 3,446,952 | 5/1969 | Sitter et al. ....................... | 350/96.26 |
| 4,483,585 | 11/1984 | Takami ............................ | 350/96.24 |
| 4,576,435 | 3/1986 | Nishioka ......................... | 350/96.26 |
| 4,666,246 | 5/1987 | Nishioka et al. ................. | 350/96.26 |

Primary Examiner—William L. Sikes
Assistant Examiner—Robert E. Wise
Attorney, Agent, or Firm—Ostrolenk, Faber, Gerb & Soffen

[57] ABSTRACT

A light transmitter, which transmits light from a light source through a light guide comprising an optical fiber flux and which includes an optical system provided with a light refracting plane and a cylindrical reflecting plane which are interposed between the light source and a light incident end plane of the light guide. The distribution characteristic of light incident upon the light guide is improved by the actions of said refracting plane and said cylindrical reflecting plane so that a uniform light flux can be introduced into the light guide. As a result, it is possible to prevent uneven illumination as well as sunburn on the light incident end plane of the light guide by the light source.

8 Claims, 4 Drawing Sheets

FIG. I
(PRIOR ART)
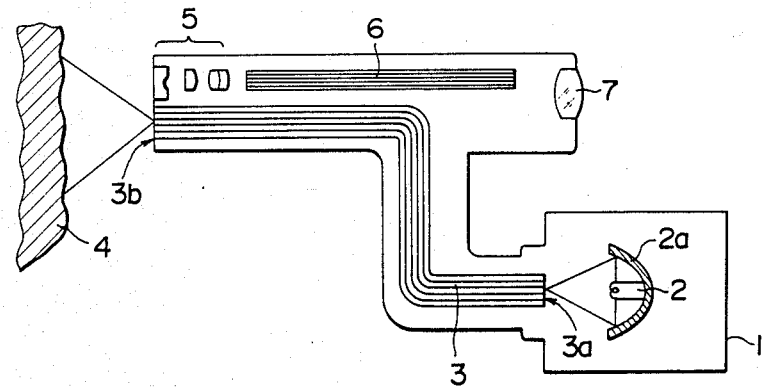
FIG. 2
(PRIOR ART)
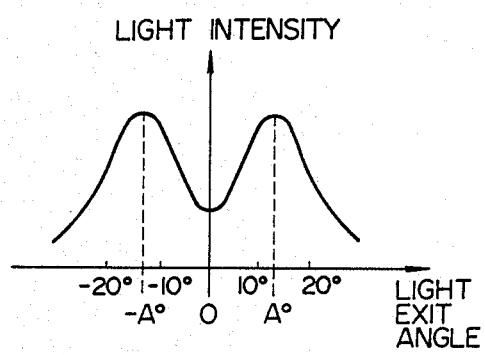
FIG. 3
(PRIOR ART)
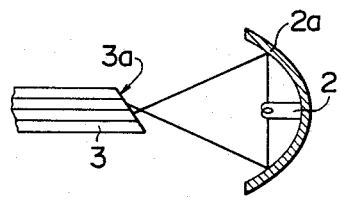

LIGHT TRANSMITTER

This application is a continuation of Ser. No. 656,862, filed Oct. 2, 1984, now abandoned.

BACKGROUND OF THE INVENTION

The present invention relates to a light transmitter, particularly, to a light transmitter provided with a light guide comprising an optical fiber flux.

As shown in FIG. 1, for example, a conventional light transmitter provided with a light guide comprising an optical fiber flux is used as an illumination optical system of an endoscope. In FIG. 1, light from a light source, 2 such as a lamp, in a light device 1 is applied to a light guide 3 directly or by being reflected by a reflector 2a and is transmitted through the light guide 3 to illuminate an object 4 to be observed. The illuminated object 4 is observed through an observation optical system comprising an objective lens 5, an image guide 6 and an eyepiece 7. However, the light distribution characteristic of the light source 2 varies with the type of light source 2. As shown in FIG. 2, the light distribution curve has a shape forming a trough at an angle of 0° and crests at angles of A° and −A°, having values ±10° to 20°, respectively. With the use of light source 2, light which emerges from the light guide 3 has a light distribution curve similar to the above shape, is dark at the central portion of a view field of an endoscope and results in uneven in illumination. To overcome this problem, as shown in FIG. 3, the light incident end plane 3a of the light guide 3 is obliquely cut. However, the filament image of the light source 2 forms adjacent to the light incident end plane 3a of the light guide 3 and causes sunburn on the high incident end plane 3a. In addition, it is extremely difficult to grind the oblique light incident end plane 3a of the light guide 3 compared to a plane such as a prism.

SUMMARY OF THE INVENTION

It is an object of the present invention to provide a light transmitter free from uneven illumination and from sunburn on a light incident end plane of a light guide.

A light transmitter according to the present invention is characterized by an optical system having a refracting plane and a cylindrical reflecting plane arranged between a light source and a light incident end plane of a light guide.

According to the present invention, illumination light from the light source is introduced into the light guide after the illumination light has been reflected and uniformized by the refracting plane and the cylindrical reflecting plane, so that uneven illumination as well as sunburn on the light incident end plane of the light guide can be prevented.

BRIEF DESCRIPTION OF THE DRAWINGS

FIG. 1 is a schematic diagram illustrating an illumination optical system of an endoscope as an example of a conventional light transmitters;

FIG. 2 is a diagram illustrating an example of the light distribution curve of a light source;

FIG. 3 is a schematic sectional view illustrating the essential parts of another example of conventional light transmitters;

DESCRIPTION OF PREFERRED EMBODIMENTS

Figure 4:
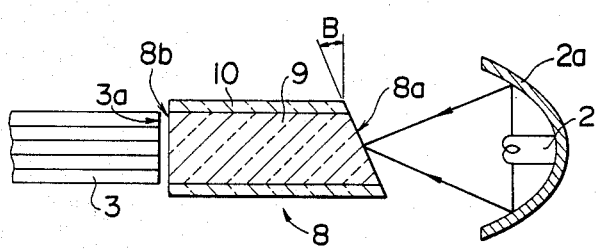
FIG. 4 is a sectional view of the essential parts of a light transmitter according to an embodiment of the present invention.

Referring now to FIG. 4, which is a light transmitter according to a first embodiment of the present invention. FIG. 4 shows an optical fiber member 8, which is disposed between a light source 2 and a light incident end plane 3a of a light guide 3, as an optical system having a refracting plane and a cylindrical reflecting plane. The fiber member 8 comprises a single optical fiber which is composed of a core 9 of refractive index n and a clad 10 of refractive index $n_1$ ($<n$). The fiber member 8 is arranged such that its optical center axis is substantially in alignment with the center axis of the light guide 3. The fiber member 8 has a light incident end plane 8a which faces the light source 2 and forms a slope of angle B with the plane perpendicular to the optical axis of the fiber member 8. A light exit end plane 8b of fiber member 8 is perpendicular to the optical axis and faces the light incident end plane 3a of the light guide 3.

Since parts not stated particularly in FIG. 4 are constructed in a manner similar to the conventional light transmitter shown in FIG. 1, corresponding parts are designated by common reference numerals and their description will not be reiterated.

Figure 5:
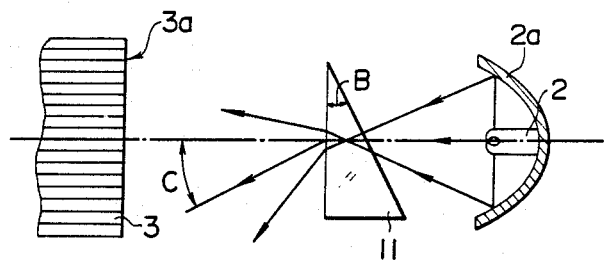
FIGS. 5 to 11 are diagrams and sectional views illustrative of actions of the light transmitter shown in FIG. 4.
Figure 6:
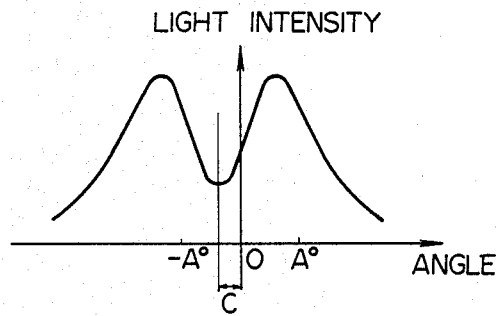
Figure 7:
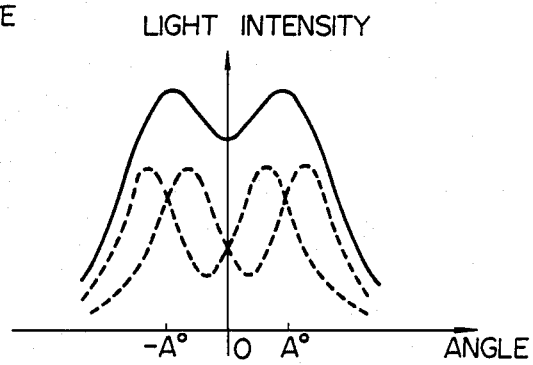
Figure 8:
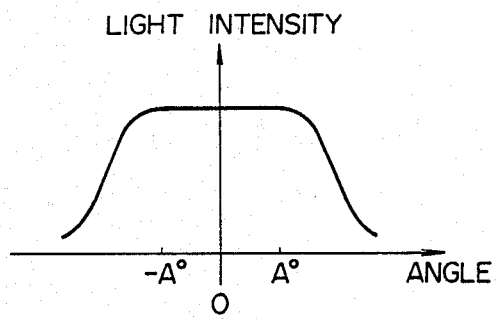

In operation, the way uneven illumination is eliminated will be described. Assuming that a prism 11 having refractive index n and a vertical angle B, is arranged between the light source 2 and the light incident end plane 3a of the light guide 3, as shown in FIG. 5 the refraction angle C of the principal light ray becomes $$C = (n-1)B \qquad (1)$$

and the light distribution curve is displaced by the angle C accordingly, as shown in FIG. 6. When light having this distribution curve is introduced into the light incident end plane 3a, a distribution curve of light emerging from the light exit end plane 3b (see FIG. 1) is shaped such that, as shown in FIG. 7, the light distribution curves shown in FIG. 6 are arranged in bilateral symmetry with respect to the ordinate (indicated by broken lines) and are then superimposed (indicated by a solid line). When the vertical angle B and the refractive index n are chosen so that $$C = A/2 \qquad (2),$$

the trough and crest of the light distribution curve are cancelled out and, as shown in FIG. 8, a light distribution curve free from unevenness in illumination is obtained. Accordingly, when fiber member 8 with the slope of the light incident end plane 8a is employed in the light transmitter of the present invention shown in FIG. 4 in place of the prism 11 shown in FIG. 5, the same effect could be obtained. In practice, the distributed light is blurred while passing through the light guide 3. Accordingly, the condition of equation (2) is loosened and results in the following relation:

$$\left| c - \frac{A}{2} \right| \leq \frac{A}{3}. \tag{3}$$

Figure 9:
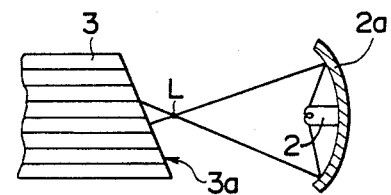
Figure 10:
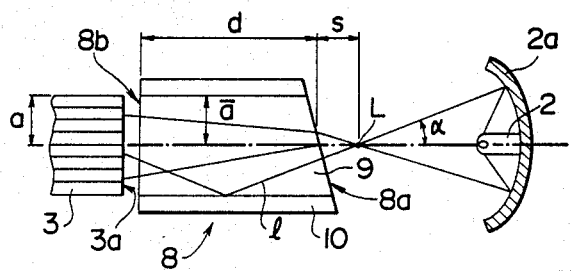
Figure 11:
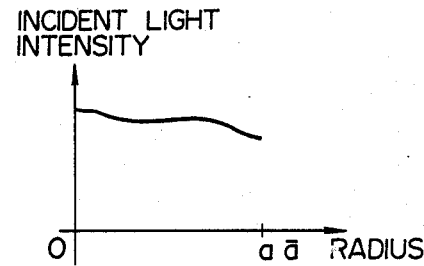

Next, the reason why sunburn on the light incident end plane 3a of the light guide 3 is prevented will be described. The sunburn on the light incident end plane 3a, as shown in FIG. 9, is caused by the fact that a filament image L of the light source 2 is formed adjacent to the light incident end plane 3a and strong light rays are converged upon the central portion of the end plane 3a alone. As shown in FIG. 10, when the fiber member 8 is employed, light from the light source 2 is reflected by the interface between the core 9 and the clad 10 to be uniformized so that the intensity distribution of light which reaches the light incident end plane 3a is as shown in FIG. 11. As a result, the phenomenon of sunburn becoming heavier toward the central portion of the light incident end 3a plane of the light guide 3, as in the conventional light transmitter, will be prevented and uneven illumination will be reduced as well.

Furthermore, requirements for the fiber member 8 will be examined. Setting aside the scope of the light incident end plane 8a of the fiber member 8, in FIG. 10, let L be the bright point image of the light source lamp, S be the air equivalent length from the light incident end plane 8a of the fiber member 8 to the bright point image L along the optical axis (the left from the light incident end plane 8a in FIG. 10 is positive and the right therefrom is negative), $\bar{a}$ be the radius of the core 9, d be the length of the fiber member 8 along its optical axis, $\alpha$ be the angle between the marginal light ray from the light source 2 and the optical axis (when the light flux is unsymmetrical with respect to the optical axis, the minimum one is taken) and n be the refractive index of the core 9. In order that light incident upon the fiber member 8 may be uniformized on the light exit end plane 8b, the marginal light ray must be reflected at least once by the interface between the core 9 and the clad 10 of the fiber member 8. Accordingly, the following relationship should be met among S, d, $\bar{a}$, $\alpha$ and n:

$$\left( -S + \frac{d}{n} \right) \tan \alpha > \bar{a} \tag{4}$$

The longer the fiber member 8 is, the more easily the uniformized light flux can be obtained. However, there is a limit of minimization the light transmitter. In this case, it is possible to obtain light flux of substantially uniform intensity distribution as long as the above relationship is satisfied.

Now, the relationship between the radius $\bar{a}$ of the core 9 and the radius a of the light guide 3 will be examined. When the radius of the light guide 3 is larger than that of the fiber member 8, that is, $a > \bar{a}$, light is transmitted by part of the light guide 3. Thus the light guide 3 is not effectively utilized. Accordingly, it is necessary that $a \leq \bar{a}$. In other words, the radius of the fiber member 8 should be equal to or greater than that of the light guide 3. When the light guide 3 and the fiber member 8 are assembled, it is difficult for their optical axes to be completely in alignment with each other and it is likely to result in their optical axes being eccentric. Even in such case, it is preferred that the end plane of the core 9 covers the light incident end plane 3a of the light guide 3. Accordingly, assuming that the deviation between the optical axes of the fiber member 8 and the light guide 3 is e, the relationship $a + e \leq \bar{a}$ should be satisfied. Assuming that the light intensity distribution on the light incident end plane 8a of the fiber member 8 is J(r) (where r is the distance from the center of the fiber member 8 in the radial direction), the total sum E' of light passing through the light incident end plane of the fiber member 8 is:

$$E' = \int_0^{\bar{a}} J(r) \cdot 2\pi r \cdot dr.$$

The light is uniformized while passing through the fiber member 8 to form light flux of substantially uniform intensity on the light exit end plane 8b. The light quantity per unit area on the light exit end plane 8b is:

$$\frac{1}{\pi \bar{a}^2} \int_0^{\bar{a}} J(r) \cdot 2\pi r \cdot dr.$$

The total quantity $\bar{E}$ of light incident upon the light guide 3 when fiber member 8 is employed is $$\bar{E} = \frac{\pi a^2}{\pi \bar{a}^2} \int_0^{\bar{a}} J(r) \cdot 2\pi r \cdot dr.$$

On the other hand, since the total quantity E of light incident upon the light guide 3 when the fiber member 8 is not employed is $$E = \int_0^a J(r) \cdot 2\pi r \cdot dr,$$

$E - \bar{E}$ is the loss of light quantity due to the presence of the fiber member 8. In addition to this, when the fiber member 8 is used, another loss of light quantity is produced on the light incident end plane 8a and the light exit end plane 8b due to the Fresnel reflection of light. The reflection factor of the Fresnel reflection is expressed by $\{(n-1)/(n+1)\}^2$ and its value is 0.04 to 0.11 where n is 1.5 to 2.0. In this case, the Fresnel reflection arises two times on the light incident end plane 8a and light exit end plane 8b of the fiber member 8 so that the loss of light quantity due to the Fresnel reflection is 0.08 to 0.22. Accordingly, when the loss of light quantity due to the Fresnel reflection is considered, it is desired that the above noted loss of the light quantity $E - \bar{E}$ be less than the loss of light quantity due to the Fresnel reflection. Accordingly, the relationship between a and $\bar{a}$ should preferably satisfy the following relationship:

$$\frac{E - \bar{E}}{E} < 0.3.$$

However, since it is practically impossible to lengthen the fiber member 8 to the extent necessary so that the light intensity distribution on the light exit end plane 8b of the fiber member 8 is completely uniformized, it may be enough if the following relationship is satisfied:

$$\frac{E - \bar{E}}{E} < 0.5. \tag{5}$$

Furthermore, in order for light, which is transmitted through light guide 3, to be totally reflected by the interface between the core 9 and the clad 10 so as not to be lost, it is necessary to meet the following conditions:

$$\sqrt{n^2 - n_1^2} > \sqrt{n_2^2 - n_3^2} \qquad (6)$$

where $n_2$ is the refractive index of the core 9 and $n_3$ is the refractive index of the clad 10.

In addition to this, in order to prevent light from the light source 2 from being lost without total reflection on the interface between the core 9 and the clad 10, it is necessary to meet the following relationship:

$$\sqrt{n^2 - n_1^2} \geq \sin(C + a). \qquad (7)$$

The reason is that, in FIG. 10, the light ray 1 of the maximum angle from light source 2 has an angle of nearly $C+\alpha$ in the air, with respect to the optical axis, after having passed through the fiber member 8. In practice, the light ray 1 of the maximum angle is so weak in the light distribution of light source 2 that it is useless. Accordingly, the broadened (7) may be loosened to obtain as follows:

$$\sqrt{n^2 - n_1^2} \geq \sin\left(C + \frac{\alpha}{2}\right). \qquad (8)$$

Figure 12:
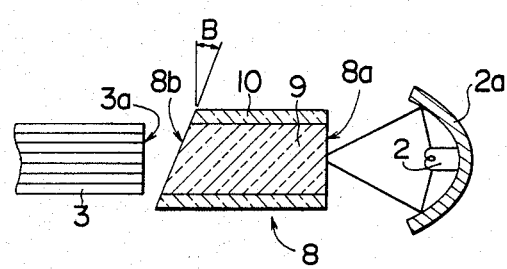
FIGS. 12 to 16 are sectional views of the essential parts of transmitters according to other embodiments of the present invention, respectively.

In FIG. 12, which illustrates a light transmitter according to a second embodiment of the present invention, the light incident end plane 8a of the fiber member 8 is perpendicular to its optical axis and the light exit end plane 8b is inclined by an angle B with respect to the plane perpendicular to the optical axis. The relationships (1), (2) and (3) which are applied to the embodiment shown in FIG. 4 are similarly applicable to the angle B.

As such, even when the light exit end plane 8b of the fiber member 8 is oblique, it is possible to achieve the same action and effect as in the light transmitter of the first embodiment in which the light incident end plane 8a is oblique.

Figure 13:
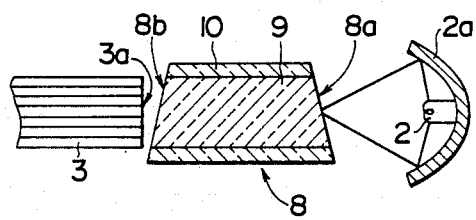

In FIG. 13, which illustrates a light transmitter according to a third embodiment of the present invention, both the light incident end plane 8a and the light exit end plane 8b of the fiber member 8 are slightly oblique with respect to the plane perpendicular to the optical axis.

As such, even when both end planes 8a and 8b of the fiber member 8 are oblique, it will be understood that the same action and effect as in the light transmitter of the first embodiment can be achieved.

Figure 14:
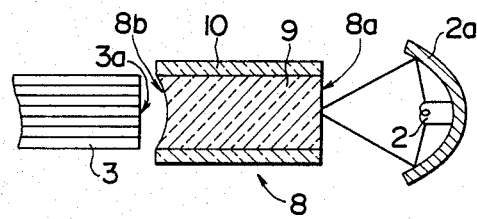
Figure 15:
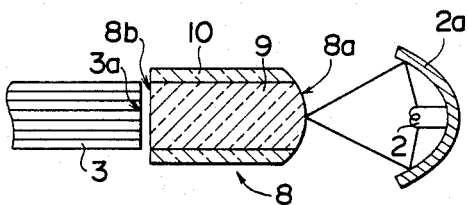

In FIG. 14, which illustrates a light transmitter of a fourth embodiment of the present invention, the light exit end plane 8b is concave. In FIG. 15, which illustrates a light transmitter of a fifth embodiment of the present invention, the light incident end plane 8a is convex.

As shown in FIGS. 14 and 15, even when the light exit end plane 8b or the light incident end plane 8a forms a curved surface, substantially the same action and effect as in the first and third embodiments having the oblique plane can be achieved.

Figure 16:
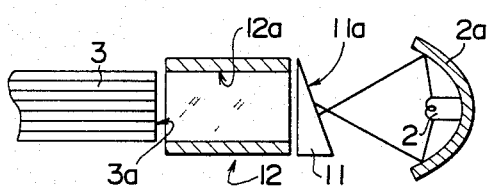

In FIG. 16, which illustrates a light transmitter of a sixth embodiment of the present invention, an assembly of a prism 11, having a refracting plane 11a which is oblique with respect to the plane perpendicular to the optical axis, and a cylindrical reflecting member 12, whose inner peripheral surface is finished forming the total reflecting plane 12a, is employed in place of the fiber member 8.

As such, even when an optical system interposed between the light source 2 and the light guide 3 is constructed by an assembly of two or more members, its action and effect are similar to those in the first embodiment shown in FIG. 4.

It is to be noted that a fiber member 8 formed of infrared absorption material is more preferable for preventing the sunburn. The clad 10 may be unnecessary or may be formed simply by solidifying adhesives. In addition, although the fiber member 8 and the cylindrical reflecting member 12 are employed in each of the foregoing embodiments, a glass bar may be utilized without being limited to the above members. Furthermore, it is to be noted that the present invention is not limited to an illumination optical system of an endoscope and is also applicable to various other light transmitter employing the light guide.

What is claimed is:

1. A light transmitter, comprising;
   a light source;
   image focusing means for focusing light from said light source into a bright spot image at a point in front of both said light source and said image focusing means;
   a light guide comprising an optical fiber bundle having first and second planar ends, said optical fiber bundle transmitting light incident upon said first end to said second end, the latter being located in front of said first end; and
   an optical system interposed between said image focusing means and said first planar end of said light guide;
   said optical system including a light exit end face confronting said first end, and a light incident end face disposed to the rear of said exit end face and in the vicinity of said bright spot image;
   said optical system being provided with a refracting plane and a cylindrical reflecting plane which cooperate to normalize light that impinges upon said first end.

2. A light transmitter according to claim 1, in which said optical system comprises a single stumpy optical fiber member including a core and a clad which has a refractive index which is smaller than that of said core, said optical system having first and second planar end faces, said first end face facing said light source to define said light incident end face and said second end face facing said first planar end of said light guide to define said light exit end face, an interface between said core and said clad forming said cylindrical reflecting plane.

3. A light transmitter according to claim 2, in which said light incident end face of said optical fiber member forms an oblique refracting plane with respect to a plane perpendicular to an optical axis of said optical fiber member.

4. A light transmitter according to claim 2, in which said light exit face of said optical fiber member forms an oblique plane with respect to a plane perpendicular to the optical axis of said optical fiber member said light exit face defining said refracting plane.

5. A light transmitter according to claim 2, in which both said light incident and exit end faces of said optical fiber member form respective oblique planes with respect to a plane perpendicular to the optical axis of said optical fiber member and define refracting planes.

6. A light transmitter according to claim 2, in which said light incident end face of said optical fiber member forms a curved plane and defines said refracting plane.

7. A light transmitter according to claim 2, in which said light exit end face of said optical fiber member forms a curved plane and defines said refracting plane.

8. A light transmitter according to claim 1, in which said optical system comprises an assembly of a prism having said refracting plane and a cylindrical reflecting member whose inner peripheral surface forms the said cylindrical reflecting plane.

* * * * *